Aug. 9, 1938. J. E. PADGETT 2,126,495
GAUGING APPARATUS
Filed Nov. 6, 1935
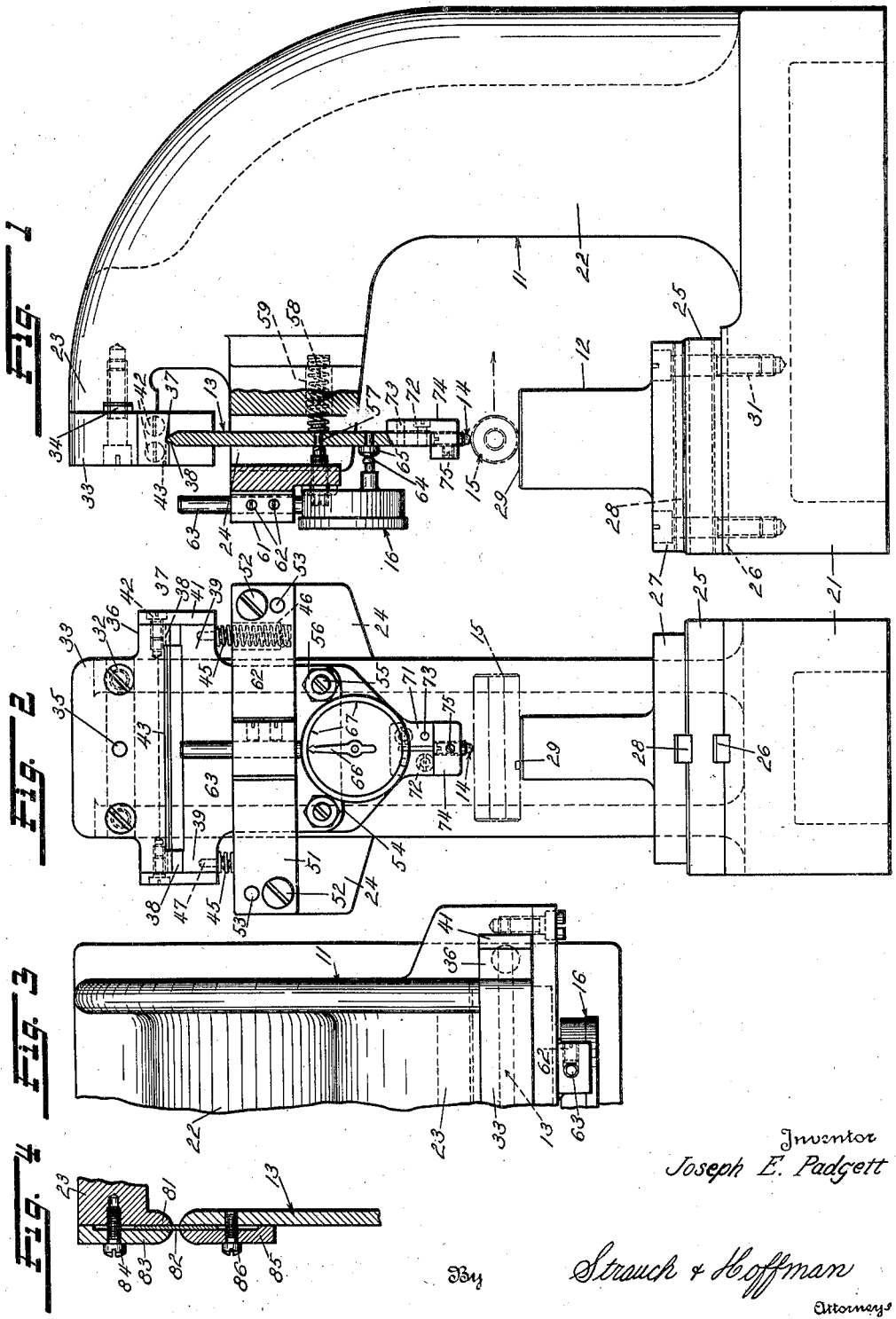
Inventor
Joseph E. Padgett
By Strauch & Hoffman
Attorneys Patented Aug. 9, 1938

2,126,495

UNITED STATES PATENT OFFICE 2,126,495

GAUGING APPARATUS

Joseph E. Padgett, Toledo, Ohio

Application November 6, 1935, Serial No. 48,605

7 Claims. (Cl. 33—148)

The present invention relates to a gauge mechanism and method and more particularly concerns a mechanism and method useful to gauge distances with reference to an exact standard or in comparison to a standard having predetermined upper and lower limits.

A primary object of the present invention resides in the provision of a gauge mechanism which will gauge distances in comparison to a fixed standard with great precision and which will automatically amplify the indication of such measurement without necessitating the use of amplifying gears or levers.

Another object of the invention resides in the provision of a gauge mechanism having a pair of opposed contacts designed to gauge distances, at least one of the contacts being mounted for movement on an arc, rather than in the direction of the dimension to be gauged so that the angular movement of the contact is substantially greater than the movement of the contact in the direction of the dimension to be gauged.

A further object of the invention resides in the provision of a gauge mechanism for gauging a given dimension of test pieces of work relative to the corresponding dimension of a standard piece of work, the mechanism being simple in construction and operation, inexpensive to manufacture and possessed of a high degree of precision in operation.

Still another object of the invention is to provide an improved method of gauging articles of manufacture that will result in greatly amplifying variations from a standard dimension or from tolerance limits of said dimension.

Further objects of the invention will appear in the following description and appended claims when considered in conjunction with the accompanying drawing in which like reference characters are employed to denote like parts of the invention throughout the several views thereof.

In the drawing:

Figure 1 is a side elevational view of the preferred form of my invention, parts of the construction being shown in section for clarity of illustration.

Figure 2 is a front elevational view of the preferred form of my invention as seen when viewing Figure 1 from the left thereof.

Figure 3 is a fragmental top plan view of the preferred form of my invention as seen when viewing Figure 2 from the top thereof.

Figure 4 is a fragmental view illustrating a modified construction for hanging the swinging blade forming a part of the present invention.

The preferred embodiment of my invention illustrated in the drawing is seen to consist briefly of a frame 11 upon which is mounted a hardened anvil 12. Pendant from frame 11 above anvil 12 is a blade 13, having a tip 14, and designed for swinging movement laterally with respect to anvil 12. Blade tip 14 and anvil 12 comprise opposed contacts for gauging pieces of work, one of which is indicated in phantom lines at 15, which are passed therebetween in the direction of the phantom arrow. An indicator 16 is mounted on frame 11 and is designed to register against the side of blade 13 for indicating swinging movement thereof under the influence of pieces of work which, in passing over anvil 12, cause lateral displacement of blade tip 14.

Referring now to the construction in greater detail, frame 11 consists of a base portion 21 from which projects upwardly a standard 22 terminating in a neck 23. A pair of spaced arms 24 extend forwardly from standard 22 below neck 23.

Superposed in frame base 21 is a spacer block 25 which is retained in proper alignment on the base by means of a key 26 and upon which, in turn, is superposed the base 27 of anvil 12 which is retained in proper alignment by means of a second key 28. The upper end of anvil 12 is machined to provide a working or contact surface indicated at 29. Bolts 31, extending through the anvil base and spacer block and threaded into the frame, are provided for securely anchoring the anvil with respect to the frame base. It will be appreciated that anvil 12 may be raised or lowered relative to the frame base by withdrawing bolts 31, removing spacer block 25, and substituting therefor a spacer block of suitable thickness.

Mounted in frame neck 23 by means of bolts 32 is a crosshead 33 which is disposed vertically above anvil 12 and on which is formed a tongue 34 designed to mate within a groove provided in the frame neck to insure accurate vertical alignment of the crosshead. A dowel pin 35 extending through tongue 34 and the groove in the frame neck is provided to insure accurate lateral alignment of the crosshead.

The lower end of crosshead 33 is formed to provide a pair of laterally offset arms 36, the lower edges of which are provided with inverted V-shaped bearing notches 37 which are disposed vertically above the center of anvil 12. Bearing within notches 37 is a pair of aligned knife-edges 38 provided on the upper end of a pair of laterally offset arms 39 formed at the top of blade 13.

Knife edges 38 and bearing notches 37 are retained in lateral alignment by means of end cap blocks 41 secured by cap screws 42 to arms 36 of the crosshead and depending past the ends of arms 39 formed on blade 13. Crosshead 33 between notches 37 is recessed as indicated at 43, the top of recess 43 being slightly above the top or apex of notches 37.

The main body of blade 13 depends from crosshead 33 above the center of anvil 12 and between arms 24 formed on the frame, and is designed for swinging movement parallel to arms 24. As seen in Figure 2, the arms 39 formed at the top of blade 13 project laterally above frame arms 24 and are urged away therefrom and into contact with crosshead 33 by means of a pair of compression springs 45. Each spring 45 acts at one end against the bottom of a bore 46 provided in its corresponding frame arm 24 and at its other end is centered by a pin 47 to react directly against the bottom of the corresponding blade arm 39.

Blade knife edges 38 are thus instantly urged into contact with crosshead bearing notches 37 to provide a fulcrum for blade 13, and since springs 45 are flexible, blade 13 may swing relative to frame arms 24.

A strap member 51 extends laterally across the front of frame arms 24 to which it is secured at each end by a cap screw 52 and a dowel pin 53 which is provided to insure accurate alignment of the strap member relative to the frame arms. Strap 51 between frame arms 24 is provided with a depending apron portion 54 into which are threaded a pair of adjustable pins 55 which project to the rear of apron 54 and serve as stops to prevent blade 13 from swinging away from frame 11 past vertical position. Turned on pins 55 against the front of apron 54 are locknuts 56 for securing and locking pins 55 in adjusted position.

The tip of each stop pin 55 in contacting blade 13 is adapted to abut the shank tip of a pin 57 mounted on blade 13 with the head of the pin disposed in the rear of the blade. Each pin 57 is provided for centering one end of a compression spring 58 which acts against blade 13 and the other end of which reacts against the bottom of a bore 59 formed in frame 11 between frame arms 24. Springs 58 thus constantly urge blade 13 into contact with stop pins 55 and resiliently oppose swinging movement of the blade toward the frame.

Mounted on the front of strap member 51 centrally between frame arms 24 is a block 61 having a vertical bore in which is secured, by set screws 62, the stem 63 of dial indicator 16 which may be of a standard form well known in the art. Dial indicator 16 is provided with an actuating plunger 64 which is designed for horizontal reciprocation and which registers against the head of a pin 65 mounted in blade 13. Dial indicator 16 is thus adapted to indicate the horizontal component of displacement of pin 65 as blade 13 undergoes swinging movement, such indication being effected by movement of a pointer 66 which registers with indicia 67 formed in the indicator dial.

The lower end of blade 13 is narrowed as indicated at 71 and secured thereto by means of cap screws 72 and dowel pins 73 is a tip holder 74. Dowel pins 73 are provided for insuring accurate alignment of the holder with respect to the blade. Threaded into a vertical bore in the bottom of tip holder 74 is tip member 14 which projects downwardly below holder 74 in direct line with the center of anvil 12. Tip member 14 is held in adjustable position in holder 74 by means of a set screw 75. Preferably tip 14 is formed of sapphire, diamond or tungsten carbide, although other suitable material of a high degree of hardness may be employed.

Figure 4 illustrates an alternate construction for use in hanging blade 13 with respect to frame 11. Neck 23 of the frame is provided with a depending lip 81 against which is secured a thin metal strip 82 by means of a detachable clamp element 83 bolted to neck 23 as indicated at 84. The lower edge of strip 82 is secured against the upper end of blade 13 by means of a detachable clamp element 85 which is bolted to the blade as indicated at 86. Metal strip 82, which is preferably from .005 inch to .010 inch in thickness, thus provides a fulcrum for permitting swinging of blade 13 without the use of knife edges.

The operation of the devices thus far described takes place in the following manner. Tip 14 of the swinging blade is first adjusted until there is slightly less gap between the tip 14 and anvil 12 than would be filled by the smallest piece of work to be gauged. A piece of work to be gauged is now pushed over anvil 12, and blade 13 is consequently swung to the right (as seen in Figure 1) until the gap between blade tip 14 and the anvil has increased sufficiently to allow the piece of work to pass the blade. Such swinging movement of blade 13 is indicated on dial indicator 16 by registration of pointer 16 with indicia 67, the indicia being so located on the dial that the pointer will lie between the indicia when a piece of work having a gauged dimension within predetermined limits is passed through the device.

Indicia 67 thus serve to establish limits within which the dimension to be gauged on a given piece of work must lie, and the device is thus effective to give merely a relative indication of the dimension to be gauged with reference to predetermined standard work samples. It is to be understood, however, that dial indicator 16 may be provided with indicia for indicating the absolute value of the dimension gauged rather than a merely relative value.

It will be seen that when blade 13 is swung away from its normally vertical position as a piece of work is passed through the mechanism, the vertical displacement of tip 14 will be much less than, although in proportion to, the horizontal displacement of the tip. Indicator 16, which responds to horizontal displacement of blade 13, therefore gives an amplified indication of the vertical displacement of blade tip 14 and hence the gap between the blade tip and the anvil. The magnitude of such amplification may be controlled by varying the radius from knife edges 38 to blade tip 14. In practice, best results have been obtained by employing a blade which will cause from .050 inch to .100 inch horizontal movement for an initial vertical movement of about .001 inch, an additional vertical movement of .0002 inch being effective to cause from .010 to .020 inch horizontal displacement.

The ratio between the horizontal movement and the vertical movement of the blade tip for a given vertical movement will vary as the blade swings away for its normally vertical position, but such variation may be readily compensated by properly inscribing the indicia 67 on the dial indicator.

As test pieces of work are passed through the device and gauged, those pieces which have a dimension less than the minimum predetermined standard will fail to cause indicator pointer 66 to register in the region between the indicia 67, whereas pieces having a dimension greater than the maximum predetermined standard will cause indicator pointer 66 to completely traverse the dial sector between indicia 67 and will cause the pointer to come to rest beyond the index determining the maximum limit. Pieces of work which are within the predetermined limits will, however, cause pointer 66 to register between indicia 67 which mark the predetermined limits.

In the event that it is desired to gauge pieces of work requiring a different gap between blade tip 14 and anvil 12, the blade tip may be adjusted relative to the anvil by loosening set screw 75, or spacer 25 may be removed beneath anvil 12 and a spacer of different thickness substituted in lieu thereof.

It will thus be appreciated that the present construction affords a gauge mechanism of simple construction, which automatically amplifies the indication of the dimension gauged without necessitating the use of amplifying gears or levers.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In a gauge mechanism a frame comprising a base and a standard having an offset neck portion above said base and a pair of arms disposed below said neck portion, an anvil secured with respect to said frame base, a removable spacer block disposed between said anvil and said frame base, a crosshead detachably secured to said frame neck and having at its lower end laterally disposed aligned notched bearing surfaces, a blade element disposed between said frame arms above said anvil and having at its upper end laterally disposed aligned knife edges bearing within said notched bearing surfaces, so that said blade may swing relative to said crosshead, said blade adjacent its upper end having a pair of laterally offset projections extending above said frame and a pair of compression springs disposed between said frame arms and said blade projections for urging said knife edges into contact with said notched bearing surfaces, an adjustable tip secured in the free lower end of said blade above said anvil, an indicator secured with respect to the extremities of said frame arms and designed to register against the front of said blade, an adjustable stop secured with respect to said frame for limiting movement of said blade away from said frame, and a compression spring for resiliently urging said blade into contact with said stop.

2. In a gauge mechanism a frame, a fixed contact mounted on said frame, a movable contact comprising a blade normally in alignment with and spaced from said fixed contact, means for hinging said blade for lateral swinging movement in an arc tangent to a plane parallel to said fixed contact, and means for indicating the extent of said swinging movement of said blade at a point adjacent to said contact comprising an indicator adapted to bear against a side of said blade, and means for adjusting said indicator along the length of said blade.

3. In a gauge mechanism a frame, a fixed contact mounted on said frame comprising an anvil having a contact face, means for adjusting said anvil relative to said frame comprising a removable spacer adapted to be inserted between said anvil and said frame, a movable contact mounted on said frame comprising a blade having a contact tip spaced from said anvil contact face, means for hinging said blade on said frame for swinging movement in an arc tangent to a line parallel to said anvil contact face, means for adjusting said contact tip along the length of said blade in the direction of said anvil for regulating the normal clearance between said anvil contact face and said movable contact tip, and means cooperating with a point on said blade adjacent to said contact tip and operable to indicate the extent of lateral displacement of said point during swinging movement of said blade.

4. In a gauge mechanism, a pair of contacts for contacting a piece of work passed therebetween, a hinge for mounting one of said contacts for lateral swinging movement relative to said other contact, said swinging contact being disposed in the plane defined by the axis of said hinge and the center point of said other contact when said contacts are in normal or initial position and means to indicate the extent of said later swinging movement.

5. In a gauge mechanism, a frame, a contact, and means for hinging said contact for swinging movement relative to said frame comprising a jaw member mounted on said frame for adjustment toward and away from said frame, a jaw member mounted on said contact for adjustment toward and away from said contact, and a flexible strip member clamped at one end between said frame and jaw and clamped at its other end between said contact and jaw, said flexible member being readily detachable from said frame and contact upon proper adjustment of said jaw members.

6. In a gauge mechanism, a frame, a fixed contact mounted on said frame and having a flat surface, means for mounting a second contact on said frame for swinging movement in an arc tangent to a line parallel to a plane including said surface, said means comprising an elongated element carrying said second contact at one end and provided with a flexible connection at its opposite end, said flexible connection including a flexible element secured to said frame and to said elongated element.

7. In a gauge mechanism, a frame, a fixed contact mounted on said frame and having a substantially flat surface, a second contact, means for mounting said second contact for lateral movement in an arc tangent to a line parallel to said surface, stop means limiting said movement in one direction when said contact is in alignment with a line perpendicular to said surface and passing through the center of said arc, resilient means for holding said mounting means against said stop means, and means for indicating the amount of lateral movement of said second contact with respect to said perpendicular line.

JOSEPH E. PADGETT.